(12) United States Patent
Smith

(10) Patent No.: US 9,677,582 B2
(45) Date of Patent: Jun. 13, 2017

(54) FLUID-ACTUATED FASTENING DEVICE

(71) Applicant: Charles R. Smith, Acton, CA (US)

(72) Inventor: Charles R. Smith, Acton, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 316 days.

(21) Appl. No.: 14/593,851

(22) Filed: Jan. 9, 2015

(65) Prior Publication Data

US 2016/0201700 A1   Jul. 14, 2016

(51) Int. Cl.
| | | |
|---|---|---|
| *F16B 1/00* | (2006.01) | |
| *F16B 4/00* | (2006.01) | |
| *F16B 5/00* | (2006.01) | |
| *F16B 21/10* | (2006.01) | |

(52) U.S. Cl.
CPC ............. *F16B 1/005* (2013.01); *F16B 4/002* (2013.01); *F16B 5/00* (2013.01); *F16B 21/10* (2013.01)

(58) Field of Classification Search
CPC .......... F16B 1/005; F16B 21/08; F16B 21/12; F16B 21/125; F16B 21/165; Y10T 403/592; Y10T 403/593; B25J 15/00
USPC .......................................................... 403/31
See application file for complete search history.

(56) References Cited

U.S. PATENT DOCUMENTS

| | | | | |
|---|---|---|---|---|
| 4,015,456 A | * | 4/1977 | Moberg ................ | E05B 67/365 70/34 |
| 4,240,290 A | | 12/1980 | Montoya et al. | |
| 4,708,040 A | * | 11/1987 | Erickson ............... | B23B 29/046 403/322.2 |
| 5,415,066 A | * | 5/1995 | Erickson ............... | B23B 29/046 408/239 R |
| 5,452,631 A | * | 9/1995 | Erickson ............... | B23B 29/046 409/234 |
| 5,697,740 A | * | 12/1997 | Von Haas ............. | B23B 29/046 279/2.23 |
| 5,870,935 A | * | 2/1999 | Erickson ............... | B23B 29/046 279/2.11 |

(Continued)

OTHER PUBLICATIONS

East: "*Measurement of Skin Friction at Low Subsonic Speeds by the Razor-Blade Technique*"; HM Stationery Office, 1966.

(Continued)

*Primary Examiner* — Daniel Wiley
(74) *Attorney, Agent, or Firm* — Tarolli, Sundheim, Covell & Tummino LLP

(57) ABSTRACT

A fluid-actuated fastening device comprises a housing including a housing body defining a fluid cavity and a fluid port. The fluid port places the fluid cavity in selective communication with an outside fluid source. A telescoping mast assembly includes a mast sleeve. A spindle has longitudinally spaced inner and outer spindle ends separated by a longitudinally oriented spindle body. The spindle body is at least partially located within the mast sleeve for telescoping longitudinal movement with respect thereto to transform the mast assembly between compressed and expanded mast states. At least one disc spring is located substantially within the fluid cavity. Introduction of pressurized fluid into the fluid cavity via the fluid port causes at least one of travel of the disc spring between flexed and relaxed spring states and translational movement of the mast between the compressed and expanded mast states.

20 Claims, 9 Drawing Sheets

(56) References Cited

U.S. PATENT DOCUMENTS

| | | | | |
|---|---|---|---|---|
| 5,918,870 A * | 7/1999 | Stark | ............... | B23B 31/1071 |
| | | | | 269/309 |
| 6,129,324 A * | 10/2000 | Blanchard | ......... | B60N 2/01533 |
| | | | | 248/188.8 |
| 8,005,570 B2 * | 8/2011 | Gloden | ............... | B23B 31/1071 |
| | | | | 403/31 |
| 8,220,804 B2 * | 7/2012 | Erickson | ................ | B23B 31/06 |
| | | | | 279/2.11 |
| 8,267,612 B2 * | 9/2012 | Yeh | ......................... | B25J 15/00 |
| | | | | 403/322.2 |
| 8,601,918 B2 * | 12/2013 | Erickson | ............... | B23B 29/046 |
| | | | | 82/158 |
| 8,636,439 B2 * | 1/2014 | Jaouen | ............... | B65D 83/0038 |
| | | | | 403/322.3 |
| 9,151,343 B2 * | 10/2015 | Norton | ................ | F16D 41/086 |

OTHER PUBLICATIONS

Rechenberg, I. "Measurement of turbulent skin-friction with the preston tube." (1962).

* cited by examiner

FLUID-ACTUATED FASTENING DEVICE

TECHNICAL FIELD

The present application relates to an apparatus and method for use of a fluid-actuated fastening device and, more particularly, to a fluid-actuated fastening device for connection to a workpiece.

BACKGROUND

Various industries, including aviation, general construction, electronics, and general manufacturing, use fasteners for a number of different purposes. For example, the aviation industry may find it desirable to quickly, reliably, and robustly attach Outer Mold Line ("OML") frequently accessed panels and doors to an aircraft's structural frame. The fastenings methods used to attach these OML panels and doors should be secure and capable of avoiding undesired and/or accidental detachment (e.g., during flight). In certain aviation applications, it may also or instead be desirable to reduce aerodynamic drag by using fasteners that hold these OML panels and doors from underneath, thereby avoiding protrusions or penetrations through the OML of the panel or door. In this situation, a fastener could be associated with the structural beam and actuated from beneath the panel to grab or grasp the panel, when actuated.

Panel fasteners may be designed for an initial actuation or installation by a user to a particular clamp-up force. Due to the desire for reliable service, panel fasteners in certain use environments, such as aviation, might then be designed to hold the initial clamp-up force without further application of energizing force until such time as a de-energizing force is positively applied by the user to facilitate selective panel removal.

SUMMARY

In an embodiment, a fluid-actuated fastening device for connection to a workpiece is provided. The fastening device comprises a housing, including a housing body defining a fluid cavity and a fluid port. The fluid port places the fluid cavity in selective communication with an outside fluid source. The housing body includes a mast aperture concentrically surrounding a longitudinal axis. A telescoping mast assembly includes a mast sleeve having longitudinally spaced inner and outer sleeve ends separated by a sleeve body defining a longitudinally oriented sleeve bore. A spindle has longitudinally spaced inner and outer spindle ends separated by a longitudinally oriented spindle body. The spindle body is at least partially located within the sleeve bore for telescoping longitudinal movement with respect thereto to transform the mast assembly between compressed and expanded mast states. A fastening mechanism is mechanically associated with the spindle and is selectively actuable to mechanically interlock with the workpiece when the mast assembly is in an at least partially expanded mast state. The mast assembly has longitudinally spaced inner and outer mast ends. At least a portion of the mast assembly extends longitudinally through the mast aperture. The inner mast end includes the inner sleeve end and is located substantially within the fluid cavity. The outer mast end includes the outer spindle end and is located substantially outside the fluid cavity. At least one disc spring has a central disc spring aperture concentrically surrounding the longitudinal axis. The disc spring is located substantially within the fluid cavity and is configured for selective travel between flexed and relaxed spring states. Introduction of pressurized fluid into the fluid cavity via the fluid port causes at least one of travel of the disc spring between the flexed and relaxed spring states and translational movement of the mast between the compressed and expanded mast states.

In an embodiment, a method of connecting a fluid-actuated fastening device to a workpiece is provided. The fastening device includes a housing, including a housing body defining a fluid cavity and a fluid port. The housing body includes a mast aperture concentrically surrounding a longitudinal axis. A telescoping mast assembly includes a mast sleeve having longitudinally spaced inner and outer sleeve ends separated by a sleeve body defining a longitudinally oriented sleeve bore. A spindle has longitudinally spaced inner and outer spindle ends separated by a longitudinally oriented spindle body. The spindle body is at least partially located within the sleeve bore for telescoping longitudinal movement with respect thereto to transform the mast assembly between compressed and expanded mast states. The mast assembly has longitudinally spaced inner and outer mast ends. At least a portion of the mast assembly extends longitudinally through the mast aperture. The inner mast end includes the inner sleeve end and is located substantially within the fluid cavity. The outer mast end includes the outer spindle end and is located substantially outside the fluid cavity. A fastening mechanism is mechanically associated with the spindle. At least one disc spring has a central disc spring aperture concentrically surrounding the longitudinal axis. The disc spring is located substantially within the fluid cavity and is configured for selective travel between flexed and relaxed spring states. The fluid cavity is placed in selective communication with an outside fluid source via the fluid port. Pressurized fluid is introduced into the fluid cavity via the fluid port. At least one of travel of the disc spring between the flexed and relaxed spring states and translational movement of the mast between the compressed and expanded mast states is caused at least partially via the pressurized fluid. The fastening mechanism is selectively actuated, at least partially via the pressurized fluid, to mechanically interlock with the workpiece when the mast assembly is in an at least partially expanded mast state. The fastening device is connected to the workpiece via the mechanical interlock of the fastening mechanism.

In an embodiment, a fluid-actuated fastening device for connection to a workpiece is provided. A housing includes a housing body defining a fluid cavity and a fluid port. The fluid port places the fluid cavity in selective communication with an outside fluid source. The housing body includes a mast aperture concentrically surrounding a longitudinal axis. A telescoping mast assembly includes a mast sleeve having longitudinally spaced inner and outer sleeve ends separated by a sleeve body defining a longitudinally oriented sleeve bore. At least a portion of the mast sleeve extends longitudinally through the mast aperture with the inner sleeve end located substantially within the fluid cavity and the outer sleeve end located substantially outside the fluid cavity. The mast sleeve is selectively longitudinally movable with respect to the housing body between compressed and expanded sleeve states. A spindle has longitudinally spaced inner and outer spindle ends separated by a longitudinally oriented spindle body. The spindle body is at least partially located within the sleeve bore for longitudinal movement with respect thereto between retracted and expanded spindle states. A fastening mechanism is mechanically associated with the spindle and is selectively actuable to mechanically interlock with the workpiece when the mast sleeve is in an at least partially expanded sleeve state. At least one disc spring has a central disc spring aperture concentrically surrounding the longitudinal axis. The disc spring is located substantially within the fluid cavity and is configured for selective travel between flexed and relaxed disc spring states. Introduction of pressurized fluid into the fluid cavity via the fluid port selectively causes all of: travel of the disc spring between the flexed and relaxed disc spring states, longitudinal movement of the mast sleeve between the compressed and expanded sleeve states, and longitudinal movement of the spindle between the retracted and expanded spindle states.

BRIEF DESCRIPTION OF THE DRAWINGS

For a better understanding, reference may be made to the accompanying drawings, in which.

DESCRIPTION OF EMBODIMENTS

Figure 1:
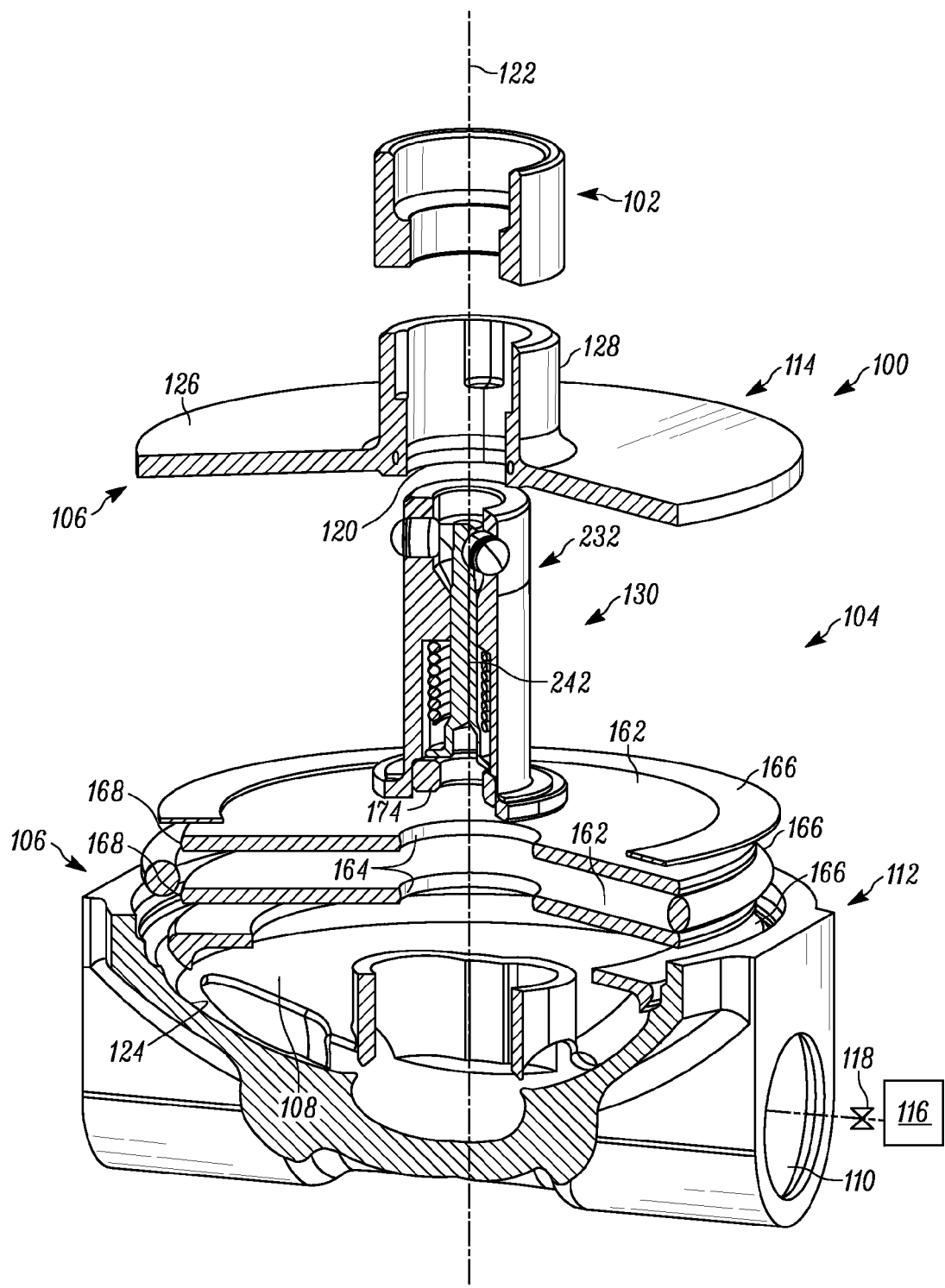
FIG. 1 is a partially exploded side cutaway view of an embodiment.

In accordance with the present description, FIG. 1 depicts a partially exploded side cutaway view of an embodiment of a fluid-actuated fastening device 100. For visual clarity, element numbers may be omitted from various of the Figures, but should be understood to be analogously applicable to all Figures where a particular numbered element is present. The term "fluid-actuated" is used herein to indicate that the fastening device 100 is selectively actuated using at least one of pneumatic power and hydraulic power, via air, nitrogen, hydraulic oil, water, or any other suitable fluid for a particular use environment. When discussing fluid power, a "positive" pressure is above a resting pressure (e.g., the atmospheric pressure of about 14.7 pounds per square inch, or about 65.4 Newtons, will be a resting pressure in many use environments, though resting pressure may vary somewhat, depending on altitude of the airport, ambient temperature, and other contributory factors), and a "negative" pressure is below a resting pressure (e.g., a vacuum is an example of a negative pressure). One of ordinary skill in the art will be able to supply appropriate type(s) and pressure(s) of actuating fluid for a particular use environment.

Regardless of the specifics of the actuating fluid, the fastening device 100 may be provided for connection to a workpiece 102. The workpiece 102 is shown here as a small cylinder or sleeve for clarity of depiction, but may have any desired shape, size, construction, material(s), or other characteristics, as long as the portion of the workpiece which directly interacts with the fastening device 100 is configured for connection thereto. Optionally, the fastening device 100 may comprise and/or be connected to a portion of at least one other workpiece (not shown), to attach the two workpieces together in any desired manner. One of ordinary skill in the art will be able to provide an appropriate arrangement of workpiece(s) and fastening device(s) for a particular use environment. For example, the workpiece 102 may be a panel in an aviation use environment, and the fastening device 100 in this example may be used to selectively connect the panel to a structural beam (not shown). It is also contemplated that the workpiece 102 may be a relatively small component, such as that shown in the Figures, temporarily or permanently connected to a larger structure. For example, the small cylinder or sleeve type workpiece 102 shown could be precision-machined for connection to the fastening device 100 and then welded into a lesser-toleranced bore or aperture in a larger workpiece. Further discussion of the nature of the workpiece 102 will be omitted from this description.

The fastening device 100 includes a housing 104, which may be a single piece or formed from a plurality of component parts. The housing 104 includes a housing body 106 defining a fluid cavity 108 and a fluid port 110. As shown in the Figures, the housing 104 depicted is made from a lower housing component 112 and an upper housing component 114, which fit together in a substantially fluidtight manner to collectively form the housing body 106.

The relative terms "lower" and "upper" are used herein to refer to directions toward the bottom and top, respectively, of FIG. 1 and similarly oriented Figures. No absolute direction is implied or intended by use of "lower" and "upper", beyond orienting the description herein, and one of ordinary skill in the art will be readily able to re-orient to a fastening device 100 which is not configured in space as shown in the Figures. The terms "substantial" and derivatives thereof are used herein to indicate a quality which is at least largely, but not necessarily wholly, that which is specified, and that the quality is sufficient for practical use. For example, "substantially fluidtight" allows for a small amount of leakage or seepage of fluid (e.g., past seals or even through the material(s) creating the housing 104) as long as the housing body 106 as a whole will be understood by one of ordinary skill in the art to be suitable for use as described.

It should also be recognized that FIGS. 1-8 are cutaway views with a portion of the fastening device 100 removed for ease of description. FIG. 9 depicts the fastening device 100 without the cutaway portions, though only the housing 104 and workpiece 102 are visible in FIG. 9. One of ordinary skill in the art will understand how to physically "complete" the portions which have been cut away visually in the Figures, to facilitate operation of the fastening device 100 as described herein.

The fluid port 110 places the fluid cavity 108 in fluid communication with an outside fluid source (shown schematically in FIG. 1 at 116). Optionally, a port valve (shown schematically in FIG. 1 at 118) could selectively prevent, allow, and/or control fluid travel through the fluid port 110, for operation of the fastening device 100 as described herein.

The housing body 106 includes a mast aperture 120 concentrically surrounding a longitudinal axis 122. The term "concentric" is used herein to indicate that two structures have a substantially common center. However, it is also contemplated that some minor misaligned or slightly off-centered relationship between structures could also be considered "concentric", for the purposes of this description.

The housing body 106 may include an inner housing surface 124 at least partially defining the fluid cavity 108 and an outer housing surface 126 spaced from the inner housing surface 124 by the housing body 106. The outer housing surface 126 optionally includes a mast collar 128 protruding therefrom and extending around a perimeter of the mast aperture 120. When present, the mast collar 128 may assist with supporting, and/or guiding the longitudinal motion of, other structures of the fastening device 100 as described herein.

Figure 2:
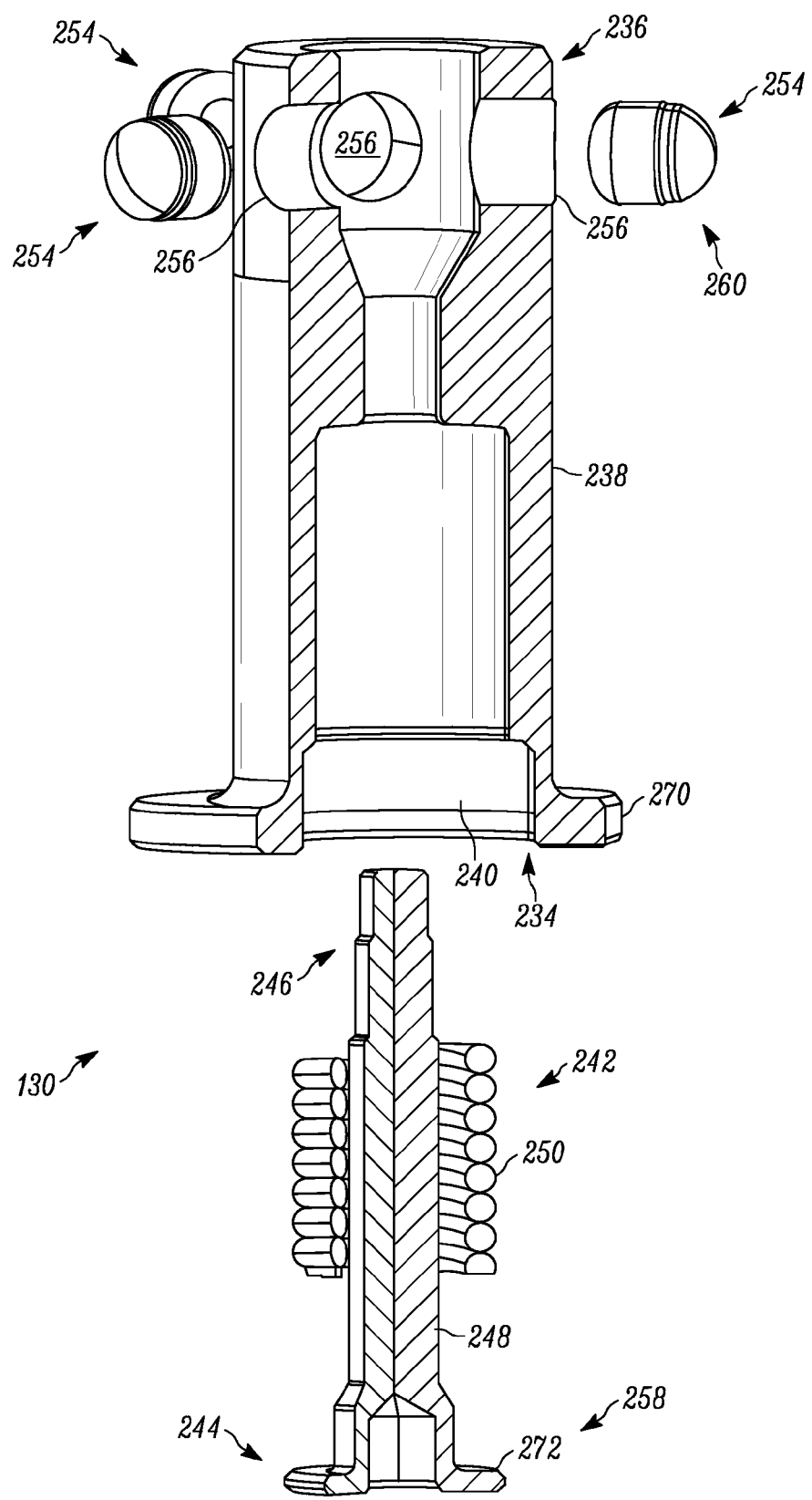
FIG. 2 is an exploded side cutaway view of a component of the embodiment of FIG. 1.
Figure 3:
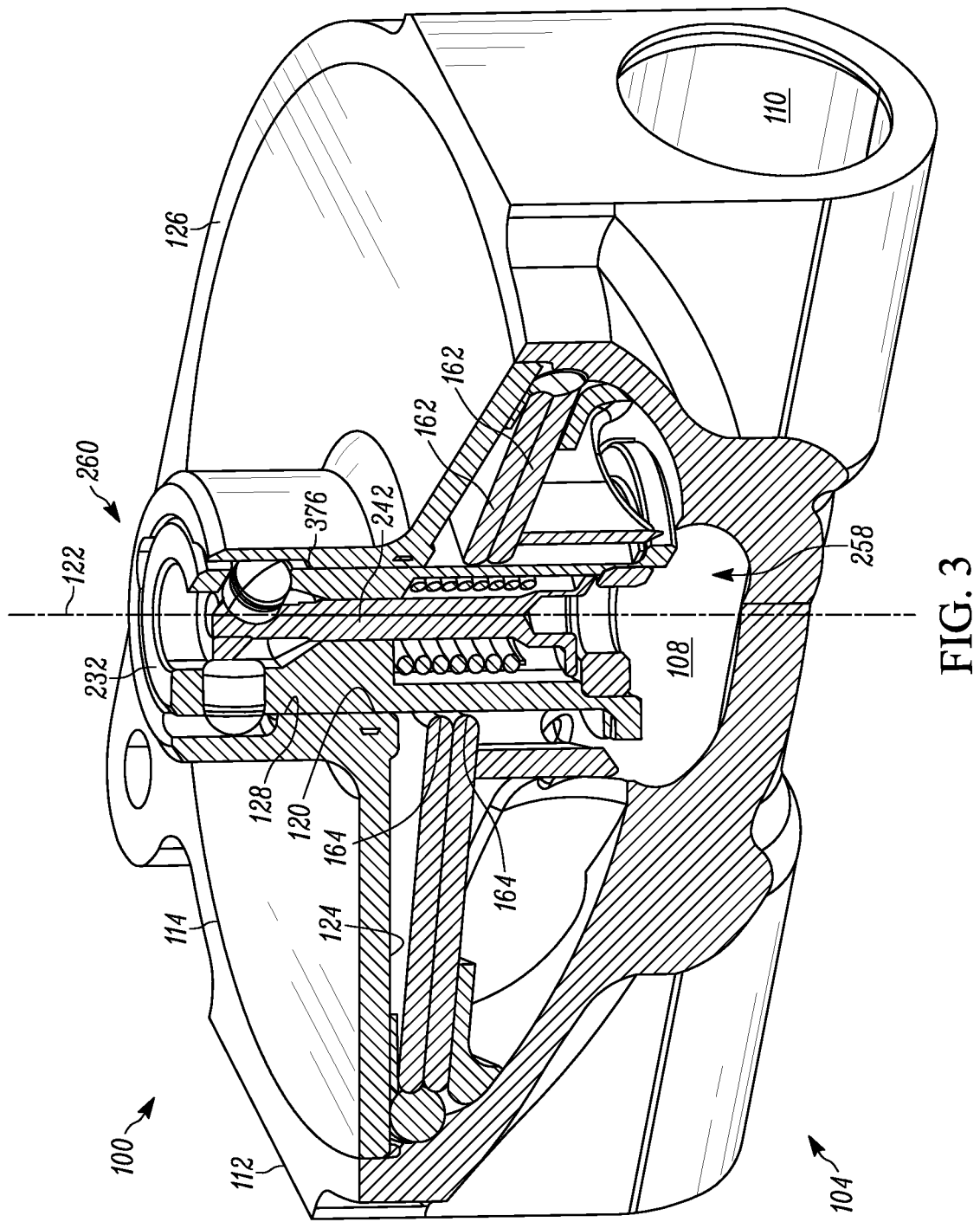
FIGS. 3-8 depict an example sequence of operation of the embodiment of FIG. 1.

The fastening device 100 includes a telescoping mast assembly 130, depicted in exploded view in FIG. 2. At least a portion of the mast assembly 130 may extend longitudinally through the mast aperture 120. With reference to FIG. 2, a mast sleeve 232 has longitudinally spaced inner and outer sleeve ends 234 and 236, respectively, separated by a sleeve body 238 defining a longitudinally oriented sleeve bore 240. The terms "inner" and "outer" are used herein relative to the mast assembly 130 components to reference structures, or portions thereof, that are respectively inside and outside the fluid cavity 108. As shown in FIG. 3, at least a portion of the mast sleeve 232 may extend longitudinally through the mast aperture 120 with the inner sleeve end 234 located substantially within the fluid cavity 108 and the outer sleeve end 236 being located substantially outside the fluid cavity 108. As will be described below, the mast sleeve 232 may be selectively longitudinally movable with respect to the housing body 106 between compressed and expanded sleeve states.

Returning to FIG. 2, a spindle 242 is provided, having longitudinally spaced inner and outer spindle ends 244 and 246, respectively, separated by a longitudinally oriented spindle body 248. The spindle body 248 is at least partially located within the sleeve bore 240 for telescoping longitudinal movement with respect thereto between retracted and expanded spindle states. Movement of the spindle between the retracted and expanded spindle states may at least partially transform the mast assembly 130 between compressed and expanded mast states. Optionally, a spindle-biasing spring 250 may be provided to interact with the spindle 242 in any suitable manner to provide the spindle 242 with a predetermined position bias. For example, as shown in the Figures, the spindle-biasing spring 250 may be located concentrically around at least a portion of the spindle body 248, inside the sleeve bore 240, to resist longitudinal motion of the spindle 242 in one direction (upward, in the orientation of the Figures) within the sleeve bore 240.

A fastening mechanism 252 may be mechanically associated with the spindle 242 and may be selectively actuable to mechanically interlock with the workpiece 102 when the mast assembly 130 is in an at least partially expanded mast state. The fastening mechanism 252 may be of any suitable design, including spring-biased, adhesive, magnetic, ratcheting, and/or any other type of components, and can be provided by one of ordinary skill in the art for a particular use application of the fastening device 100. Optionally, at least a portion of the fastening mechanism 252 may be located at least partially in the sleeve body 238 (e.g., extending laterally through at least a portion of the sleeve body 238) in either an affixed or relatively movable manner. The term "laterally" is used herein to describe a direction which is substantially perpendicular to the longitudinal axis 122.

As shown and described herein, for example, the fastening mechanism 252 may include at least one captured-ball mechanism (A.K.A. "captive-ball mechanism") 254 (three shown), at least partially carried by, and extending laterally through, corresponding ball aperture(s) 256 in the sleeve body 238. In this example, the spindle 242 is a ball spindle and selectively actuates the captured-ball mechanisms 254 to mechanically interlock with the workpiece 102 as described herein. For example, at least one captured-ball mechanism 254 may be spring-biased substantially into the sleeve body 238 when the spindle 242 is in the expanded spindle state and may be pushed laterally at least partially out of the sleeve body 238 by the spindle 242 when the spindle 242 is in the retracted spindle state. As with various physical configurations of all components of the present embodiment, one of ordinary skill in the art will readily be able to determine spindle 242 outer profiles, sleeve bore 240 inner profiles, captured-ball mechanism 254 spring forces, and any other details of implementation for a particular use environment of the present embodiment without regard to the specific physical configuration(s) shown in the Figures.

The structures shown in FIG. 2 can be assembled, as shown in FIG. 3, into a mast assembly 130 having longitudinally spaced inner and outer mast ends 258 and 260. The inner mast end 258 may include the inner sleeve end 234 and be located substantially within the fluid cavity 108, as shown in FIG. 3. Also as shown in FIG. 3, the outer mast end 260 may include the outer spindle end 246 and be located substantially outside the fluid cavity 108.

With reference again to the exploded view of FIG. 1, at least one disc spring 162 (two shown and described here) may be provided. The disc springs 162, also known as Belleville springs or Belleville washers, each include a central disc spring aperture 164 concentrically surrounding the longitudinal axis 122. One of ordinary skill in the art can readily provide any desired number, type, or configuration of disc springs 162 for a particular use environment of the fastening device 100. For example, to achieve a desired clamp-up force for the fastening device 100, the material, physical dimensions (e.g., thickness), and/or number of disc springs 162 could be suitably adjusted or provided. The disc springs 162 are located substantially within the fluid cavity 108 and are configured for selective travel between flexed and relaxed spring states. In the flexed spring state, the central disc spring apertures 164 are raised somewhat above an outer disc spring rim 168, under an upwardly-oriented holding force; in the relaxed spring state, the central disc spring apertures 164 are "flat" and substantially longitudinally aligned with (i.e., neither markedly above or below) the outer disc spring rim 168, with little to no force exerted by the disc springs 162 upon adjacent structures. These flexibility and force-exerting properties are illustrated in further detail in the sequence of FIGS. 3-8, described below.

Also in FIG. 1, a plurality of seals 166 are provided. The seals 166 are used to prevent fluid leakage between adjoining components of the fastening device 100, such as longitudinally between the two disc springs 162, and one or more seals 166 having any suitable type, material, position, dimensions, or other variables can be readily provided by one of ordinary skill in the art for a particular configuration of the fastening device 100.

Optionally, as shown in FIG. 2, at least one of the inner sleeve end 234 and the inner spindle end 244 includes a flange. For example, as shown, the inner sleeve end 234 may include a sleeve flange 270 and the inner spindle end 244 may include a spindle flange 272. When present, the sleeve and/or spindle flanges 270, 272 may be configured for selective interaction with a respective one of the disc spring 162 and the mast sleeve 232 to at least partially help prevent the respected inner sleeve end 234 and inner spindle end 244 from separating from the respective disc spring 162 and mast sleeve 232. For example, as shown in the Figures, the mast sleeve 232 may include a mast sleeve ring 174 which is attached inside the sleeve bore 240 at or near the inner sleeve end 234. Interaction between the spindle flange 272 and the mast sleeve ring 174 will at least partially help prevent the spindle 242 from "falling" out from the inner sleeve end 234.

With reference to the sequence of FIGS. 3-8, the fastening device 100 can be connected, as part of a fluid (e.g., hydraulic or pneumatic) logic system, to a workpiece 102 through interaction of the fastening device 100 components as shown and described herein.

In FIG. 3, the fastening device 100 is in a fully retracted, "bottomed out", initial/rest position. The spindle 242 is in the compressed spindle state, with the spindle flange 272 close to or resting on the mast sleeve ring 174. The mast sleeve 232 is, likewise, in a compressed sleeve state, with the inner sleeve end 234 at a lowermost point of (longitudinal) travel and optionally close to, even perhaps resting on, the inner housing surface 124 at the bottom of the fluid cavity 108. The fastening mechanism 252 is not actuated, though it is noted that the captured-ball mechanisms 254 could interact with an interior of the mast collar 128 (e.g., interact with a collar groove 376) to space the sleeve flange 270 longitudinally above the bottom of the fluid cavity 108, as desired. Accordingly, the mast assembly 130 as a whole can be considered to be in a compressed mast state in FIG. 3. Here, the outer sleeve end 236 is substantially flush with a top rim of the mast collar 128, though it is contemplated that the outer sleeve end 236 could be retracted into or slightly protruding from the mast collar 128, as desired. The disc springs 162 are in a relaxed spring state, substantially longitudinally flat within the fluid cavity 108. The fluid cavity 108 is in selective communication with the outside fluid source 116 via the fluid port 110, and optionally via the port valve 118, when present. It is contemplated that the fastening device 100 may be stored in the non-energized state shown in FIG. 3.

Figure 4:
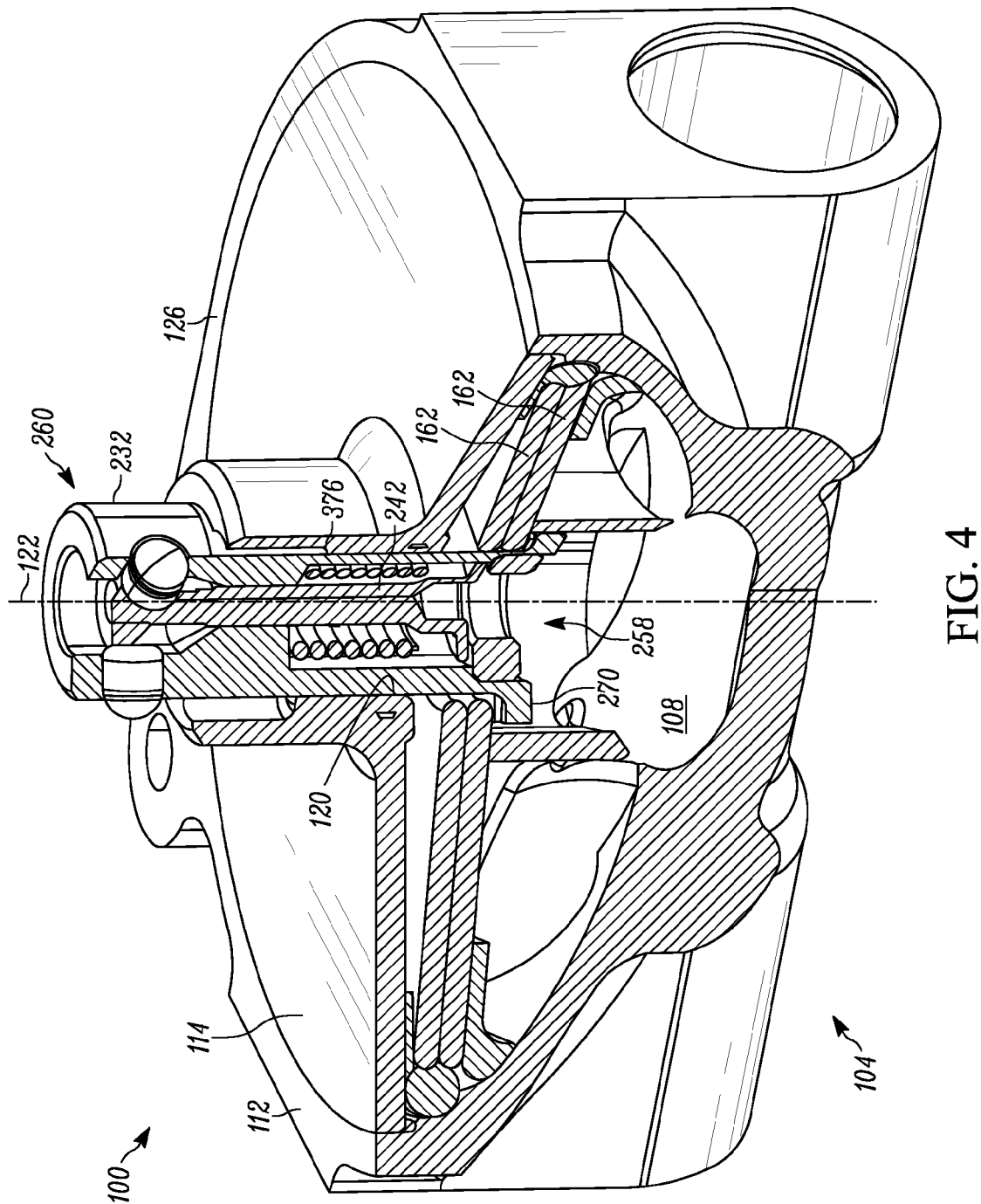

Positively pressurized fluid is then introduced into the fluid cavity 108 via the fluid port 110, causing the fastening device 100 to shift to the position shown in FIG. 4, in a first phase of deployment. As fluid pressure builds in the fluid cavity 108, the mast sleeve 232 travels longitudinally upward, such as via force exerted in a "sail-like" action of the pressurized fluid upon the sleeve flange 270, into an at least partially expanded sleeve state, where the outer sleeve end 236 is protruding upward from the mast collar 128 further than it was in the compressed sleeve state. The mast assembly 130, by virtue of travel of the mast sleeve 232, likewise could be said to be traveling into an at least partially expanded mast state.

Although the spindle 242 also could move due to the influence of fluid pressure within the fluid cavity 108, pressure has not built past a movement threshold of the spindle 242 in the situation shown in FIG. 4. The fluid-driven movement, or "fluid logic", of all components of the fastening device 100 can be tuned, driven, configured, or otherwise controlled, at least partially, by one of ordinary skill in the art through the selection of biasing spring forces (e.g., the disc springs 162 and spindle-biasing spring 250) and/or the provision of surface area(s) of the affected components which is subject to fluid force. For example, reducing the surface area of the sleeve flange 270 will increase the fluid pressure needed to "catch" the sleeve flange 270 and thus move the mast sleeve 232 as described herein.

Various portions of the present description refer to travel of various components "between", for example, compressed and expanded states. It should be understood that these components travel through a range of positions between the absolute/fully compressed and absolute/fully expanded states, and the claims herein should not be interpreted to require binary travel or configuration between the extreme ends of those ranges. One of ordinary skill in the art will understand that movement can occur along a portion of the available travel range without harm to the relatively "expanded" and "compressed" statuses, and will accordingly interpret the present description as including a degree of "at least partial" expansion or compression (for example), unless "fully" or "absolutely" states are explicitly specified.

Figure 5:
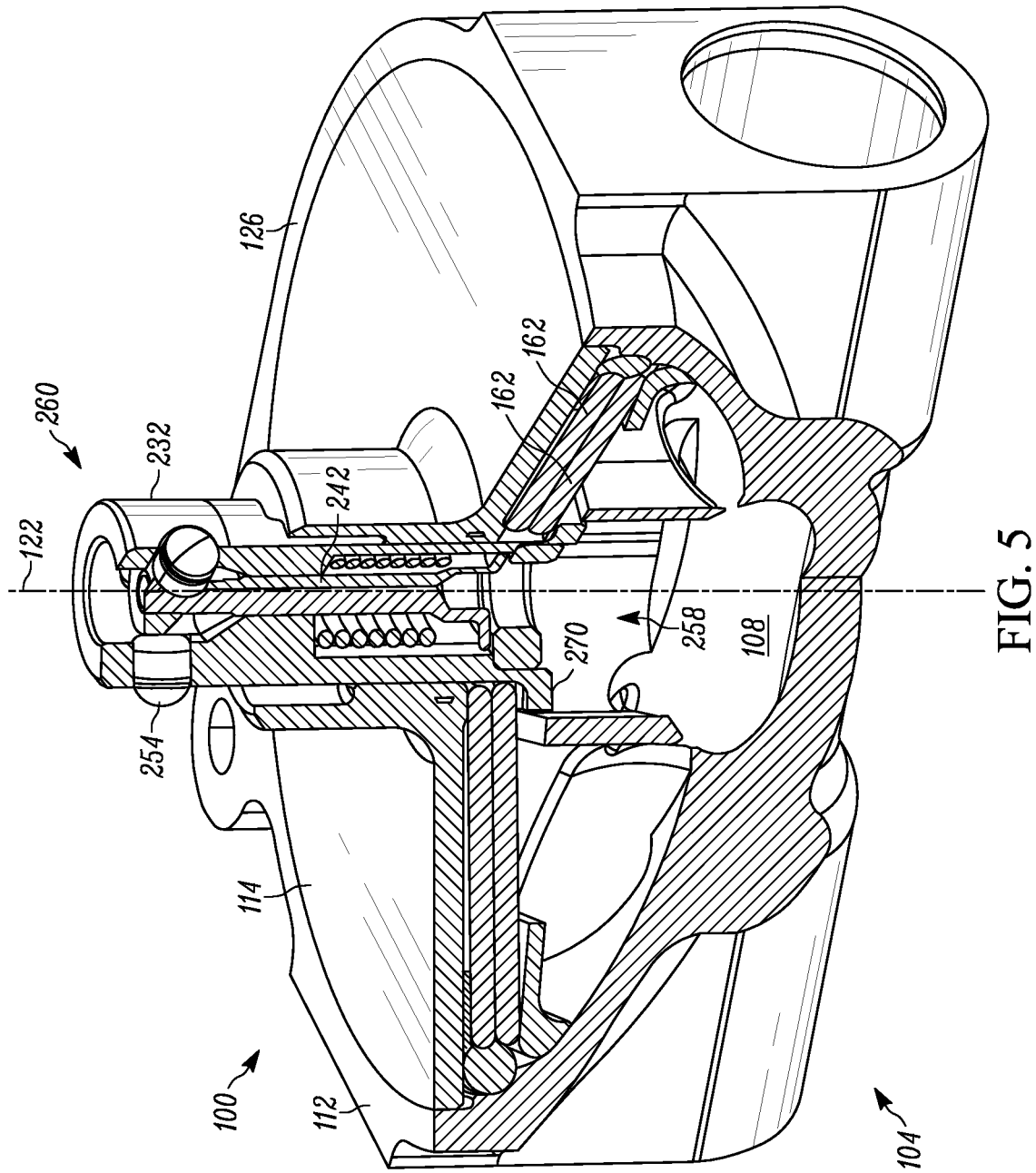

Proceeding from FIG. 4 to FIG. 5, it can be seen that the positive fluid pressure in the fluid cavity 108 continues to increase, and the sleeve flange 270 "catches" on the lowermost disc spring central aperture 164 and at least partially pulls on that disc spring central aperture 164. Fluid pressure on the underside of the lowermost disc spring 162 and/or continued fluid pressure upon the sleeve flange 270 causes the disc springs 162 to travel from the original relaxed spring state of FIGS. 3-4 to the flexed spring state shown in FIG. 5. The mast sleeve 232 is still translating upward between the compressed and expanded sleeve states in this second phase of deployment.

Figure 6:
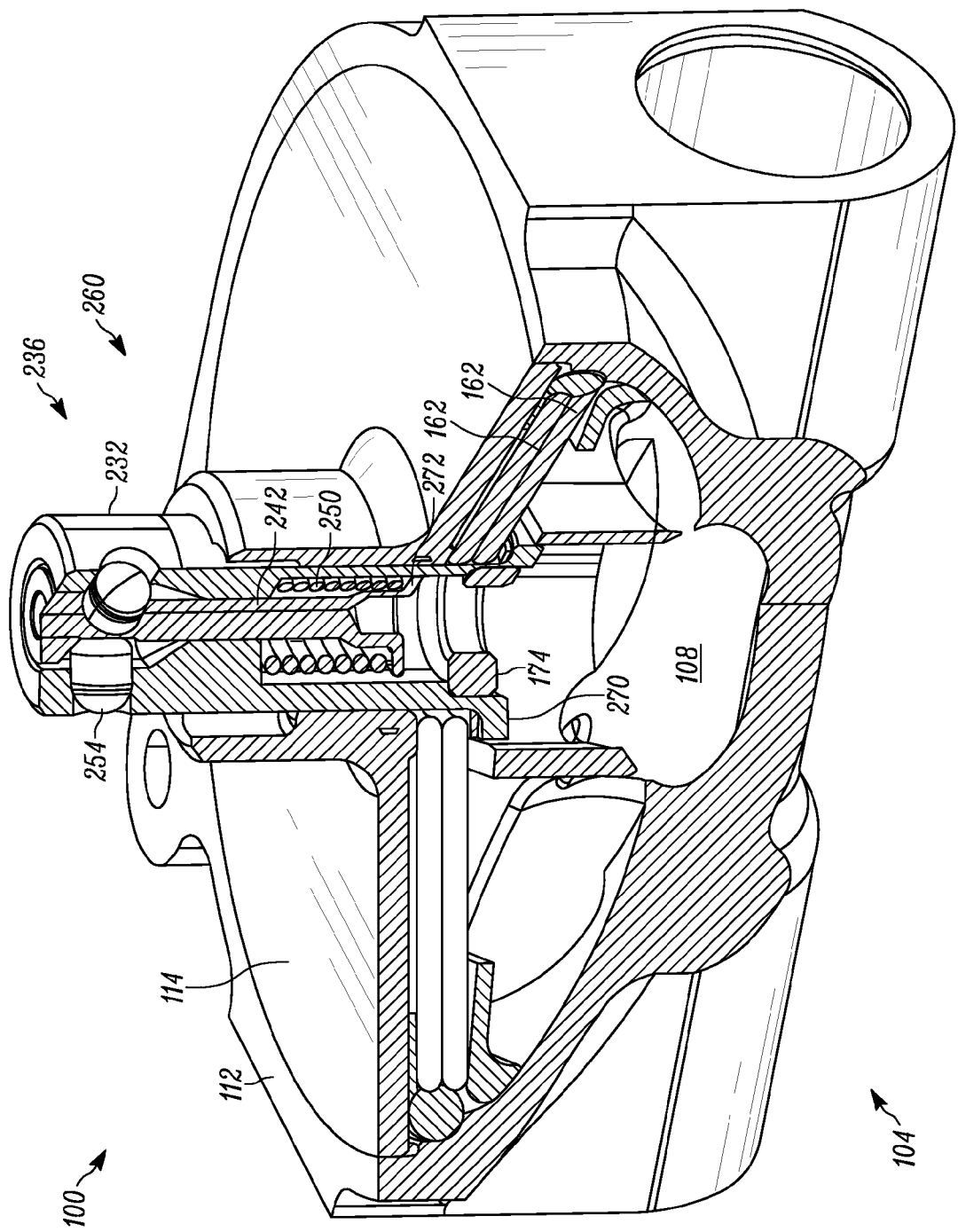

A third phase of deployment of the fastening device 100 is shown in FIG. 6. Continued positive fluid pressure application to the fluid cavity 108 through the fluid port 110 has built the fluid cavity 108 pressure to a point where the mast sleeve 232 has reached a fully expanded sleeve state and the disc springs 162 are fully flexed. Because the fluid in the fluid cavity 108 will still be seeking to expand, the fluid presses against the spindle flange 272 or another portion of the inner spindle end 244 to force the spindle 242 upward, from the compressed spindle state toward the expanded spindle state. Particularly during the third phase of deployment, shown in FIG. 6, the spindle-biasing spring 250 pushes downward on the spindle flange 272 to resist the fluid pressure in the fluid cavity 108 and thereby resist longitudinal movement of the spindle 242 toward the expanded mast state. Nonetheless, FIG. 6 depicts a "full" extension of components for the example configuration of the fastening device 100 shown in these Figures, with the disc springs 162 in a fully flexed state, and the mast assembly 130 in a fully expanded mast state, wherein the mast sleeve 232 is in a fully expanded sleeve state and the spindle 242 is in a fully expanded spindle state.

It should be noted that the outer lateral profile of the spindle body 248 is pushing the captured-ball mechanisms 254 (which are spring-biased laterally inward toward the longitudinal axis 122) outwardly from the ball apertures 256 in FIGS. 3-5. However, longitudinal travel of the spindle 242 upward into the configuration of FIG. 6 allows the captured-ball mechanisms 254 to relax and retract back into the ball apertures 256 as shown. In other words, the captured-ball mechanisms 254 may be selectively actuated by longitudinal travel of the spindle 242 driven by at least one of the pressurized fluid and the spindle-biasing spring 250.

Figure 7:
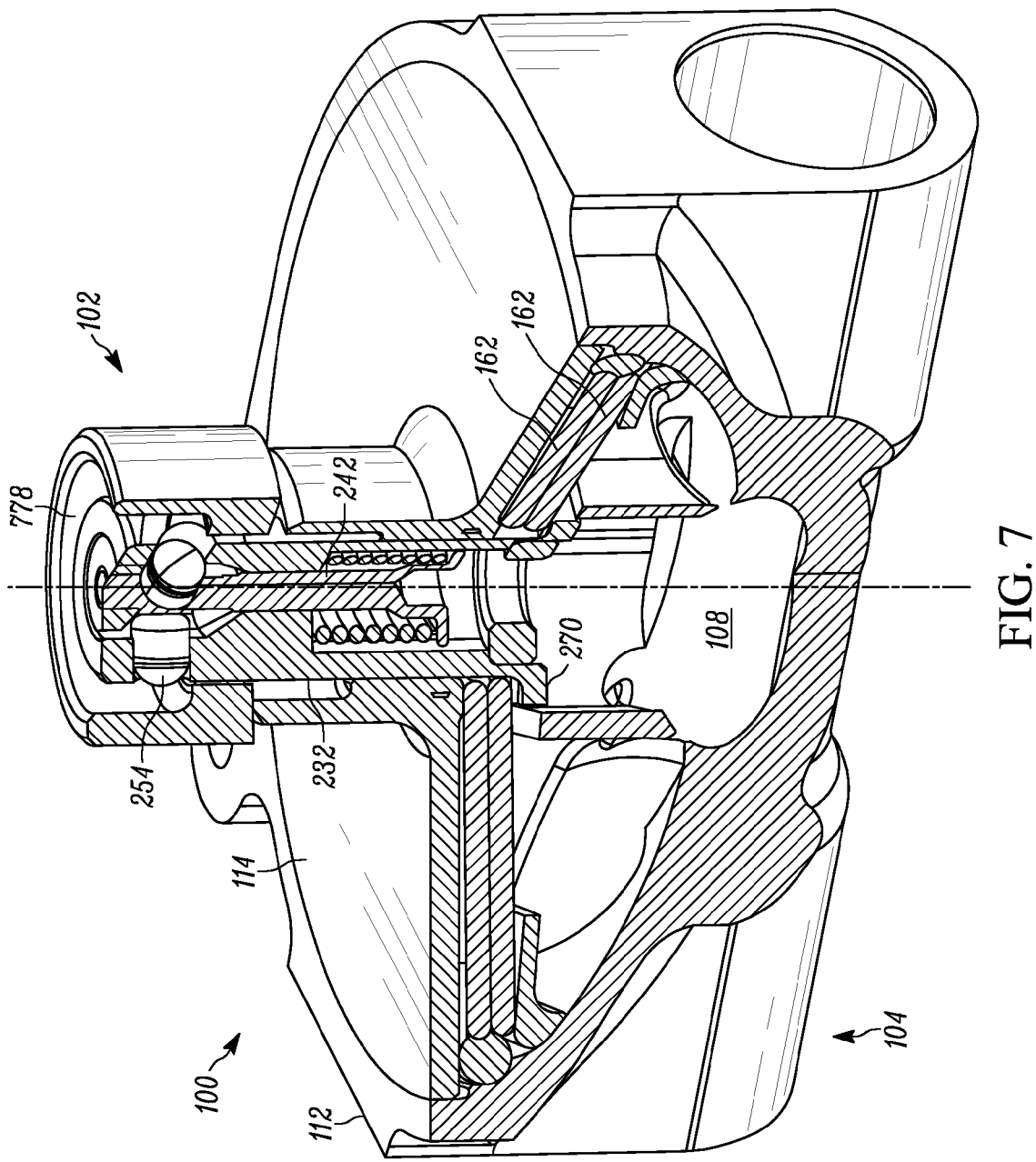

Turning then to FIG. 7, the fourth phase of deployment, a workpiece 102 of any desired nature has been placed over the outer mast end 260, though the fastening device 100 has not changed configuration/phase from FIG. 6 to FIG. 7, and the fluid pressure in the fluid cavity 108 is held substantially constant, as well. Retraction of the captured-ball mechanisms 254 into the sleeve body 238, as shown in FIG. 6, allows the workpiece 102 to be relatively slid over the outer sleeve end 236 without "catching" on protruding captured-ball mechanisms 254. In many use environments of the present embodiment, the workpiece 102 will include a through or blind workpiece cavity 778 for accepting the outer mast end 260. The workpiece cavity 778 may have a shape, such as the "shouldered" profile shown in FIG. 7, which is configured to mechanically interlock with at least a portion of the fastening mechanism 252 (e.g., as described herein) and thereby connect the fastening device to the workpiece 102.

Figure 8:
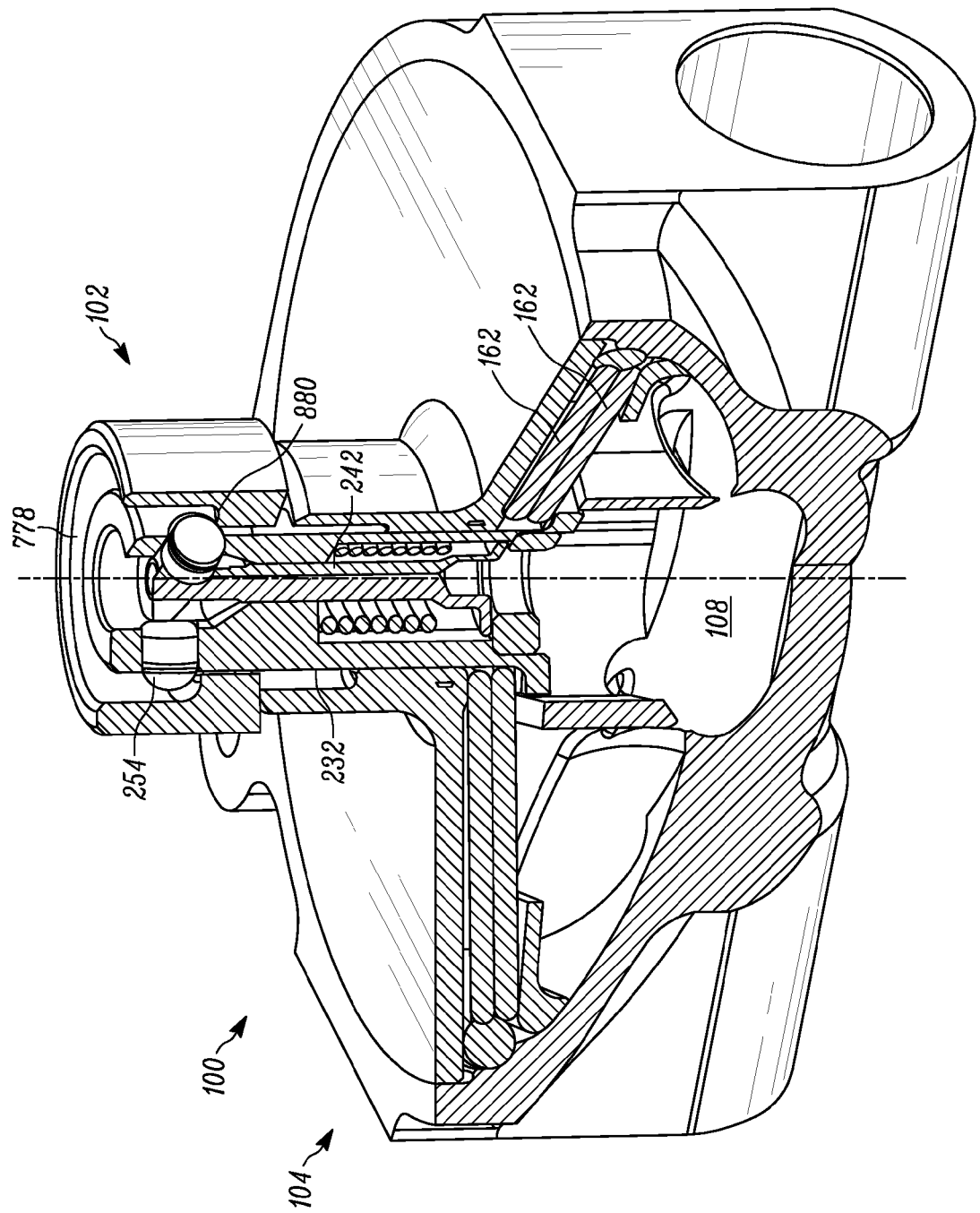
Figure 9:
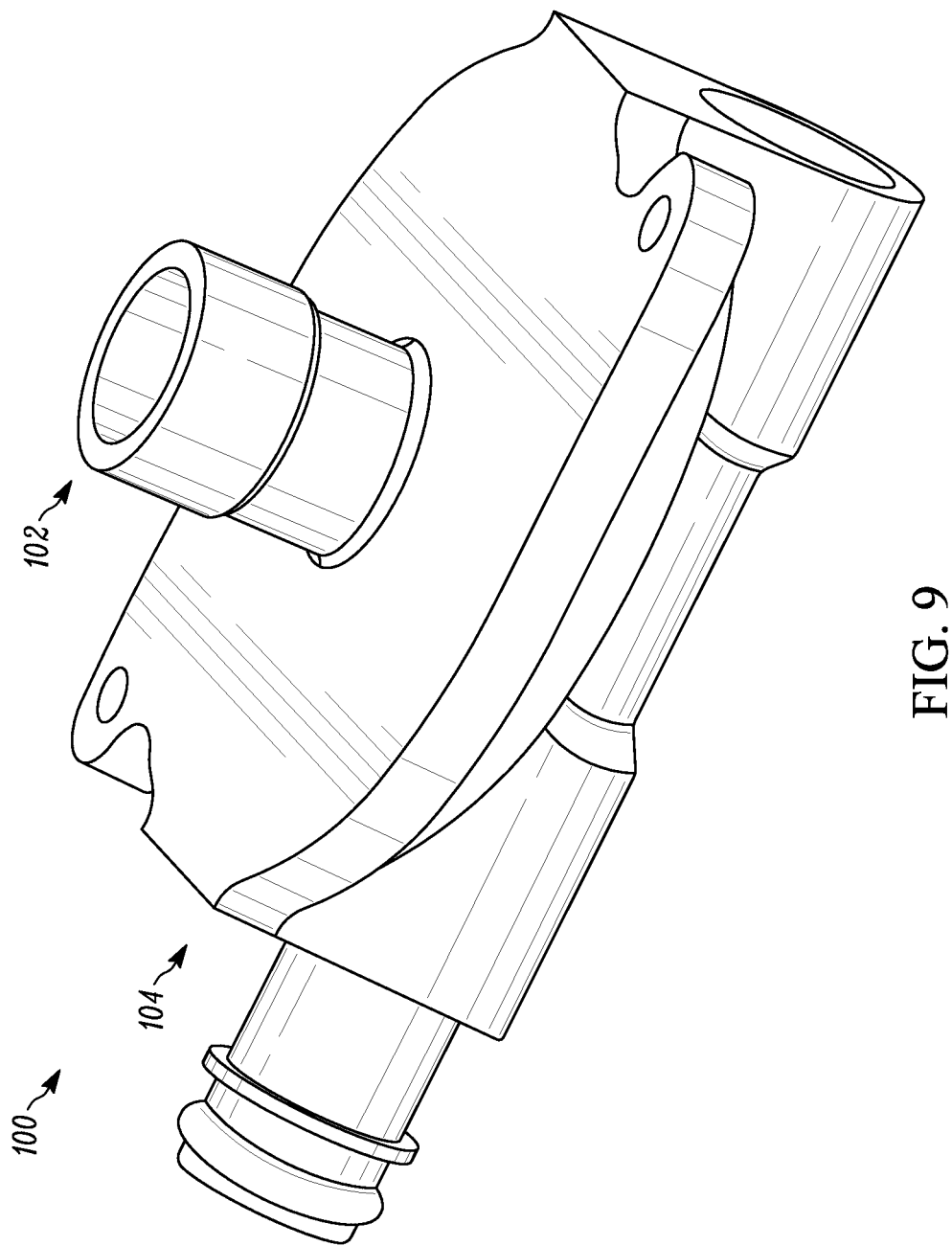
FIG. 9 is a perspective side view of the embodiment of FIG. 1.

Finally, in FIG. 8, the fifth phase of deployment is shown. In FIG. 8, the fluid pressure in the fluid cavity 108 has been slightly decreased from the level in the third/fourth phases of deployment. For example, a relatively small amount of negative fluid pressure (i.e., at least partial vacuum) could be supplied to the fluid cavity 108 via the fluid port 110. Downward pressure on the spindle flange 272 by the spindle-biasing spring 250 and/or the decreased fluid cavity 108 pressure from below the spindle flange 272 (e.g., in combination with the weight of the spindle 242) causes the spindle 242 to travel from the expanded spindle state in FIG. 7 toward the compressed spindle state in FIG. 8. This motion of the spindle 242 concurrently causes the outer lateral profile of the spindle body 248 to once again push the captured-ball mechanisms 254 laterally outward from the ball apertures 256 and thus cause the captured-ball mechanisms 254 to protrude from the sleeve body 238. Optionally, though the Figures are not shown to scale and the flexure of the disc springs 162 are merely shown schematically therein, the disc springs 162 can flex slightly to pull the sleeve body 238 slightly downward in this phase, as well.

The protruding captured-ball mechanisms 254, shown in FIG. 8, will "catch" on a shoulder 880 of the workpiece cavity 778 and the mechanical interlock thus formed will prevent withdrawal of the mast assembly 130 (and, in turn, the remainder of the fastening device 100) from connection with the workpiece 102. The configuration of the fastening device 100 shown in FIG. 8 is therefore a "steady state" configuration of the formed connection, and the outside fluid source 116 can be disconnected from the fluid port 110 (which might then be sealed off by the port valve 118) or otherwise prevented from substantially changing the fluid pressure inside the fluid cavity 108 from its level in the fifth phase of deployment. The disc springs 162, still in an at least partially flexed position, will be pulling downward on the sleeve flange 270 to place longitudinally downward pressure on the protruding captured-ball mechanisms 254 and, as a result, "jam" or otherwise force the captured-ball mechanisms 254 into contact with the shoulder 880 under a desired amount of clamp-up force. This mechanical interlock between the fastening mechanism 252 and the workpiece cavity 778 (and thereby the connection between the fastening device 100 and the workpiece 102) may be maintained substantially without further attention from the operator for as long as the fluid cavity 108 pressure does not change. That is, selectively preventing fluid travel through the fluid port 110 will at least partially prevent one or more of: travel of the disc springs 162 between the flexed and relaxed spring states, translational movement of the mast assembly 130 between the compressed and expanded mast states, and cessation of the mechanical interlock between the fastening mechanism 100 and the workpiece 102.

For example, once "charged" into the FIG. 8 configuration, the fastening device 100 will hold a panel onto an airframe of an aircraft. In aircraft use environments, it is contemplated that the fastening device 100 will be configured to prevent unwanted effects of altitude-induced air pressure changes on the fastening device 100.

To remove the fastening device 100 from the workpiece 102, the sequence of FIGS. 3-8 may be substantially reversed, with appropriate changes to the polarity (positive/negative) of the fluid pressure being provided. Optionally, mere venting of the fluid cavity 108 to atmosphere (e.g., via opening of the port valve 118) could suffice to allow the disc springs 162 to pull at least a portion of the mast assembly 130 downward and thus out of engagement with the workpiece 102. However, it is also contemplated that negative fluid pressure (i.e., at least partial vacuum) may be provided to cause and/or hasten disengagement of at least a portion of the fastening device 100 from the mechanical interlock with the workpiece 102.

To summarize the fastening device 100 motions captured by the discrete views in the sequence of FIGS. 3-8, introduction of pressurized fluid into the fluid cavity via the fluid port causes at least one of: travel of the disc springs 162 between the flexed and relaxed spring states and translational movement of at least a portion of the mast assembly 130 between the compressed and expanded mast states (for example, translational movement of the spindle 242 between the compressed and expanded spindle states and/or translational movement of the mast sleeve 232 between the compressed and expanded sleeve states). Introduction of positively pressurized fluid into the fluid cavity 108 via the fluid port 110 causes at least one of: travel of the disc springs 162 from the relaxed spring state to the flexed spring state and translational movement of at least a portion of the mast assembly 130 from the compressed mast state to the expanded mast state (for example, translational movement of the spindle 252 from the compressed spindle state to the expanded spindle state and/or translational movement of the mast sleeve 232 from the compressed sleeve state to the expanded sleeve state). Finally, introduction of negatively pressurized fluid into the fluid cavity 108 via the fluid port 110 causes at least one of: travel of the disc springs 162 from the flexed spring state to the relaxed spring state and translational movement of at least a portion of the mast assembly 130 from the expanded mast state to the compressed mast state (for example, translational movement of the spindle 252 from the expanded spindle state to the compressed spindle state and/or translational movement of the mast sleeve 232 from the expanded sleeve state to the compressed sleeve state).

The disclosed fastening device 100 has a generally concentric structure of the various components due to the use of round/annular, rotationally symmetrical disc springs 162. It is contemplated, however, that one or more rotationally asymmetrical springs, such as leaf springs, could be used instead. In such a situation, the housing 104, or any other component(s) of the fastening device 100 could be asymmetrical or non-concentric. One of ordinary skill in the art could readily provide a fastening device 100 having any desired dimensions, proportions, symmetries/asymmetries, or other physical properties for a particular use environment.

While aspects of the present embodiment have been particularly shown and described with reference to the preferred embodiment above, it will be understood by those of ordinary skill in the art that various additional embodiments may be contemplated without departing from the spirit and scope of the present embodiment. For example, an adhesive, solder, lock washer, or other engagement enhancing device could be provided to help maintain, permanently or temporarily, a desired engagement between structures of the fastening device 100. While the fastening device 100 is described as including one or more disc springs 162, it is contemplated that any other suitable type of spring, such as, but not limited to, tapered or straight coil springs, piezoelectric springs, leaf springs, or any other type of spring or combination thereof, could also or instead be provided to assist with operation of the fastening device 100 as described herein. The specific methods described above for using the described fastening device 100 and related structures are merely illustrative; one of ordinary skill in the art could readily determine any number of devices, sequences of steps, or other means/options for tethering the fastener as described. Any of the described structures and components could be integrally formed as a single piece or made up of separate sub-components, with either of these formations involving any suitable stock or bespoke components and/or any suitable material or combinations of materials. Though certain components described herein are shown as having specific geometric shapes, all structures of the present embodiment may have any suitable shapes, sizes, configurations, relative relationships, cross-sectional areas, materials (e.g., Ti 6/4, graphite, steel, aluminum, other metals, elastomers, plastics, other materials, or any combinations thereof), or any other physical characteristics as desirable for a particular application of the present embodiment. Any structures or features described with reference to one embodiment or configuration of the present embodiment could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of the present embodiment as determined based upon the claims below and any equivalents thereof.

Other aspects, objects, and advantages of the present embodiment can be obtained from a study of the drawings, the disclosure, and the appended claims.

I claim:

1. A fluid-actuated fastening device for connection to a workpiece, the fastening device comprising:
    a housing, including a housing body defining a fluid cavity and a fluid port, the fluid port placing the fluid cavity in selective communication with an outside fluid source, the housing body including a mast aperture concentrically surrounding a longitudinal axis;
    a telescoping mast assembly including:
        a mast sleeve having longitudinally spaced inner and outer sleeve ends separated by a sleeve body defining a longitudinally oriented sleeve bore,
        a spindle having longitudinally spaced inner and outer spindle ends separated by a longitudinally oriented spindle body, the spindle body being at least partially located within the sleeve bore for telescoping longitudinal movement with respect thereto to transform the mast assembly between compressed and expanded mast states, and
        a fastening mechanism mechanically associated with the spindle and selectively actuable to mechanically interlock with the workpiece when the mast assembly is in an at least partially expanded mast state,
        the mast assembly having longitudinally spaced inner and outer mast ends, at least a portion of the mast assembly extending longitudinally through the mast aperture, the inner mast end including the inner sleeve end and being located substantially within the fluid cavity, and the outer mast end including the outer spindle end and being located substantially outside the fluid cavity; and
    at least one disc spring having a central disc spring aperture concentrically surrounding the longitudinal axis, the disc spring being located substantially within the fluid cavity and being configured for selective travel between flexed and relaxed spring states;
    wherein introduction of pressurized fluid into the fluid cavity via the fluid port causes at least one of travel of the disc spring between the flexed and relaxed spring states and translational movement of the mast assembly between the compressed and expanded mast states.

2. The fastening device of claim 1, wherein the housing body has an inner housing surface at least partially defining the fluid cavity and an outer housing surface spaced from the inner housing surface by the housing body, the outer housing surface including a mast collar protruding therefrom and extending around a perimeter of the mast aperture.

3. The fastening device of claim 1, wherein at least one of the inner sleeve end and the inner spindle end includes a flange configured for selective interaction with a respective one of the disc spring and the mast sleeve to at least partially help prevent the at least one of the inner sleeve end and the inner spindle end from separating from the respective disc spring and mast sleeve.

4. The fastening device of claim 3, wherein the pressurized fluid acts upon the flange of at least one of the inner sleeve end and the inner spindle end to at least partially cause translational movement of the mast assembly between the compressed and expanded mast states.

5. The fastening device of claim 1, wherein introduction of positively pressurized fluid into the fluid cavity via the fluid port causes at least one of travel of the disc spring from the relaxed spring state to the flexed spring state and translational movement of the mast assembly from the compressed mast state to the expanded mast state.

6. The fastening device of claim 1, wherein introduction of negatively pressurized fluid into the fluid cavity via the fluid port causes at least one of travel of the disc spring from the flexed spring state to the relaxed spring state and translational movement of the mast assembly from the expanded mast state to the compressed mast state.

7. The fastening device of claim 1, including a port valve selectively preventing fluid travel through the fluid port and thereby selectively preventing at least one of travel of the disc spring between the flexed and relaxed spring states and translational movement of the mast between the compressed and expanded mast states.

8. The fastening device of claim 1, wherein the spindle is a ball spindle and the fastening mechanism includes at least one captured-ball mechanism selectively actuable by the ball spindle to mechanically interlock with a workpiece cavity of the workpiece and thereby connect the fastening device to the workpiece.

9. The fastening device of claim 8, wherein the ball spindle is spring-biased via a spindle-biasing spring to resist longitudinal movement toward the expanded mast state, and the at least one captured-ball mechanism is selectively actuated by longitudinal travel of the ball spindle driven by at least one of the pressurized fluid and the spindle-biasing spring.

10. The fastening device of claim 1, wherein the fastening mechanism is located at least partially in the sleeve body.

11. A method of connecting a fluid-actuated fastening device to a workpiece, the method comprising:
    providing a fastening device, including
        a housing, including a housing body defining a fluid cavity and a fluid port, the housing body including a mast aperture concentrically surrounding a longitudinal axis;
        a telescoping mast assembly including:
            a mast sleeve having longitudinally spaced inner and outer sleeve ends separated by a sleeve body defining a longitudinally oriented sleeve bore,
            a spindle having longitudinally spaced inner and outer spindle ends separated by a longitudinally oriented spindle body, the spindle body being at least partially located within the sleeve bore for telescoping longitudinal movement with respect thereto to transform the mast assembly between compressed and expanded mast states, the mast assembly having longitudinally spaced inner and outer mast ends, at least a portion of the mast assembly extending longitudinally through the mast aperture, the inner mast end including the inner sleeve end and being located substantially within the fluid cavity, and the outer mast end including the outer spindle end and being located substantially outside the fluid cavity, and a fastening mechanism mechanically associated with the spindle; and at least one disc spring having a central disc spring aperture concentrically surrounding the longitudinal axis, the disc spring being located substantially within the fluid cavity and being configured for selective travel between flexed and relaxed spring states;

placing the fluid cavity in selective communication with an outside fluid source via the fluid port;

introducing pressurized fluid into the fluid cavity via the fluid port;

causing, at least partially via the pressurized fluid, at least one of travel of the disc spring between the flexed and relaxed spring states and translational movement of the mast assembly between the compressed and expanded mast states;

selectively actuating the fastening mechanism, at least partially via the pressurized fluid, to mechanically interlock with the workpiece when the mast assembly is in an at least partially expanded mast state; and connecting the fastening device to the workpiece via the mechanical interlock of the fastening mechanism.

12. The method of claim 11, including:

providing at least one of the inner sleeve end and the inner spindle end with a flange configured for selective interaction with a respective one of the disc spring and the mast sleeve to at least partially help prevent the at least one of the inner sleeve end and the inner spindle end from separating from the respective disc spring and mast sleeve; and acting upon the flange of at least one of the inner sleeve end and the inner spindle end with the pressurized fluid to at least partially cause translational movement of the mast assembly between the compressed and expanded mast states.

13. The method of claim 11, including selectively preventing fluid travel through the fluid port and thereby selectively preventing all of: travel of the disc spring between the flexed and relaxed spring states, translational movement of the mast assembly between the compressed and expanded mast states, and cessation of the mechanical interlock between the fastening mechanism and the workpiece.

14. A fluid-actuated fastening device for connection to a workpiece, the fastening device comprising:

a housing, including a housing body defining a fluid cavity and a fluid port, the fluid port placing the fluid cavity in selective communication with an outside fluid source, the housing body including a mast aperture concentrically surrounding a longitudinal axis;

a telescoping mast assembly including:

a mast sleeve having longitudinally spaced inner and outer sleeve ends separated by a sleeve body defining a longitudinally oriented sleeve bore, at least a portion of the mast sleeve extending longitudinally through the mast aperture with the inner sleeve end located substantially within the fluid cavity and the outer sleeve end located substantially outside the fluid cavity, the mast sleeve being selectively longitudinally movable with respect to the housing body between compressed and expanded sleeve states;

a spindle having longitudinally spaced inner and outer spindle ends separated by a longitudinally oriented spindle body, the spindle body being at least partially located within the sleeve bore for longitudinal movement with respect thereto between retracted and expanded spindle states, and a fastening mechanism mechanically associated with the spindle and selectively actuable to mechanically interlock with the workpiece when the mast sleeve is in an at least partially expanded sleeve state; and at least one disc spring having a central disc spring aperture concentrically surrounding the longitudinal axis, the disc spring being located substantially within the fluid cavity and being configured for selective travel between flexed and relaxed disc spring states;

wherein introduction of pressurized fluid into the fluid cavity via the fluid port selectively causes all of: travel of the disc spring between the flexed and relaxed disc spring states, longitudinal movement of the mast sleeve between the compressed and expanded sleeve states, and longitudinal movement of the spindle between the retracted and expanded spindle states.

15. The fastening device of claim 14, wherein at least one of the inner sleeve end and the inner spindle end includes a flange configured for selective interaction with a respective one of the disc spring and the mast sleeve to at least partially help prevent the at least one of the inner sleeve end and the inner spindle end from separating from the respective disc spring and mast sleeve.

16. The fastening device of claim 15, wherein the pressurized fluid acts upon the flange of at least one of the inner sleeve end and the inner spindle end to at least partially cause a respective one of longitudinal movement of the mast sleeve between the compressed and expanded sleeve states and longitudinal movement of the spindle between the retracted and expanded spindle states.

17. The fastening device of claim 14, including a port valve selectively preventing fluid travel through the fluid port and thereby selectively preventing all of: travel of the disc spring between the flexed and relaxed disc spring states, longitudinal movement of the mast sleeve between the compressed and expanded sleeve states, and longitudinal movement of the spindle between the retracted and expanded spindle states.

18. The fastening device of claim 14, wherein the spindle is a ball spindle and the fastening mechanism includes at least one captured-ball mechanism extending laterally through at least a portion of the sleeve body and being selectively actuable by the ball spindle to mechanically interlock with a workpiece cavity of the workpiece and thereby connect the fastening device to the workpiece.

19. The fastening device of claim 18, wherein the ball spindle is spring-biased via a spindle-biasing spring to resist longitudinal movement toward the expanded sleeve state, and the at least one captured-ball mechanism is selectively actuated by longitudinal travel of the ball spindle driven by at least one of the pressurized fluid and the spindle-biasing spring.

20. The fastening device of claim 19, wherein the at least one captured-ball mechanism is spring-biased substantially into the sleeve body when the spindle is in the expanded spindle state and is pushed laterally at least partially out of the sleeve body by the spindle when the spindle is in the retracted spindle state.

* * * * *

UNITED STATES PATENT AND TRADEMARK OFFICE
CERTIFICATE OF CORRECTION

| | | |
|---|---|---|
| PATENT NO. | : 9,677,582 B2 | Page 1 of 1 |
| APPLICATION NO. | : 14/593851 | |
| DATED | : June 13, 2017 | |
| INVENTOR(S) | : Charles R. Smith | |

It is certified that error appears in the above-identified patent and that said Letters Patent is hereby corrected as shown below:

In the Claims

Column 12, Line 32 reads "mast" should read --mast assembly--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*